(12) United States Patent
Ohnuma

(10) Patent No.: US 7,923,169 B2
(45) Date of Patent: Apr. 12, 2011

(54) SELF-SEALING FUEL CELL SEPARATOR

(75) Inventor: Satoshi Ohnuma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 302 days.

(21) Appl. No.: 10/556,536

(22) PCT Filed: Apr. 27, 2004

(86) PCT No.: PCT/JP2004/006090
§ 371 (c)(1),
(2), (4) Date: Nov. 14, 2005

(87) PCT Pub. No.: WO2004/102712
PCT Pub. Date: Nov. 25, 2004

(65) Prior Publication Data
US 2007/0207365 A1    Sep. 6, 2007

(30) Foreign Application Priority Data
May 16, 2003    (JP) ................. 2003-138652

(51) Int. Cl.
*H01M 2/14* (2006.01)
(52) U.S. Cl. .................. 429/508; 429/469; 429/460
(58) Field of Classification Search ............. 429/12–43
See application file for complete search history.

(56) References Cited

U.S. PATENT DOCUMENTS

| | | | |
|---|---|---|---|
| 4,644,751 A * | 2/1987 | Hsu | ................................ 60/676 |
| 6,045,934 A | 4/2000 | Enami | |
| 6,856,467 B2 | 2/2005 | Iyama | |
| 2001/0023761 A1* | 9/2001 | Motzet et al. | .................. 165/166 |
| 2002/0064703 A1* | 5/2002 | Mizuno | ............................. 429/35 |
| 2002/0086196 A1 | 7/2002 | Utsunomiya et al. | |
| 2003/0064272 A1* | 4/2003 | Inagaki et al. | .................. 429/34 |
| 2005/0064266 A1* | 3/2005 | Abdou et al. | .................... 429/35 |

(Continued)

FOREIGN PATENT DOCUMENTS

DE    100 15 360 A1    10/2001

(Continued)

OTHER PUBLICATIONS

English Translation of German Office Action, Appln. No. 112004000783.6, issued Aug. 23, 2007.

*Primary Examiner* — Dah-Wei D Yuan
*Assistant Examiner* — Maria J Laios
(74) *Attorney, Agent, or Firm* — Kenyon & Kenyon LLP

(57) ABSTRACT

A metal separator defines a fluid passage. The fluid passage defines a reactant gas passage formed at a first, MEA-opposing surface of the metal separator, a coolant passage formed at a second, opposite surface of the metal separator, a reactant gas manifold fluidly connected to the reactant gas passage and a coolant manifold fluidly connected to the coolant passage. The metal separator includes a rib formed thereon so as to surround a portion of the metal separator where the fluid passage is formed. The rib is adapted to contact a metal separator of an adjacent fuel cell to construct a seal for a fluid passage surrounded by the rib. A plurality of seal lines where each seal line includes each rib may be provided. By virtue of the presence of the rib, a gasket provided in a fuel cell of comparison does not need to be provided.

16 Claims, 5 Drawing Sheets

U.S. PATENT DOCUMENTS

2005/0064267 A1    3/2005   Guttermann et al.

FOREIGN PATENT DOCUMENTS

| | | |
|---|---|---|
| DE | 10060872 | 1/2002 |
| DE | 101 58 772 C1 | 6/2003 |
| DE | 10248531 | 4/2004 |
| EP | 1 006 600 A2 | 6/2000 |
| EP | 1 286 404 | 2/2003 |
| GB | 2 163 595 A * | 2/1986 |
| JP | 03-222264 A | 10/1991 |
| JP | 10-261423 | 9/1998 |
| JP | 10-308227 | 11/1998 |
| JP | 11-007967 | 1/1999 |
| JP | 2000-156234 A | 6/2000 |
| JP | 2000-231927 A | 8/2000 |
| JP | 2000-294254 A | 10/2000 |
| JP | 2001-015133 | 1/2001 |
| JP | 2002-231261 A | 8/2002 |
| JP | 2002/289223 | 10/2002 |

* cited by examiner

FIG. 3
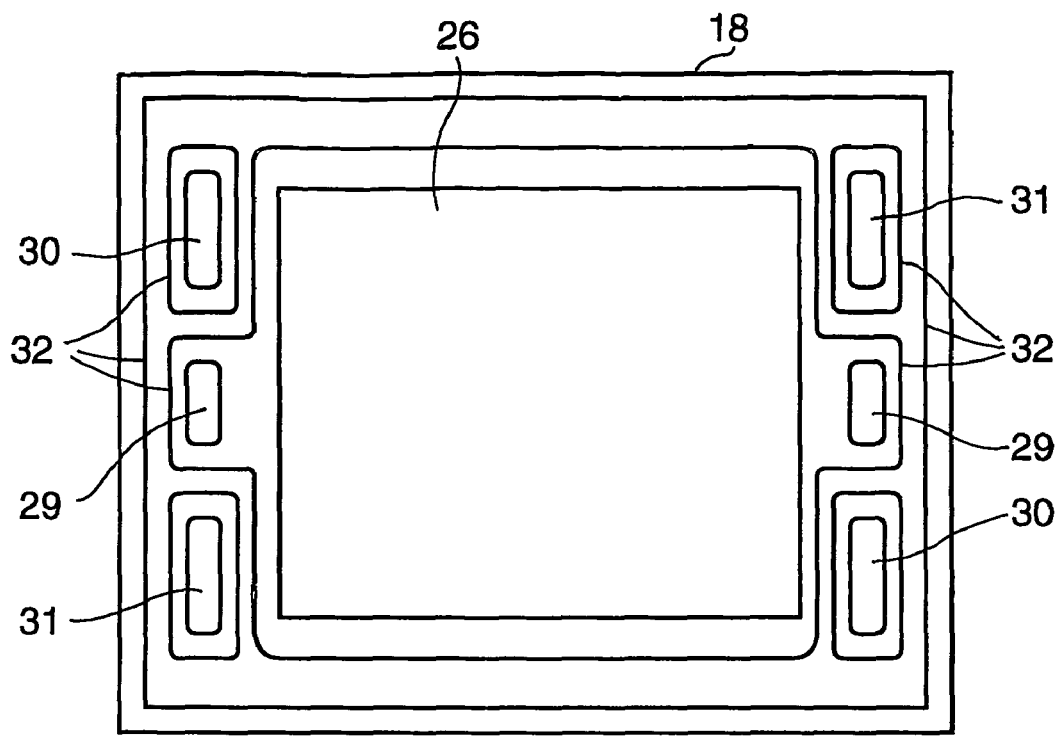
FIG. 4A    FIG. 4B    FIG. 4C
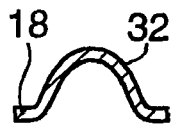 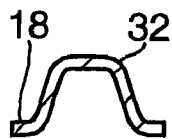 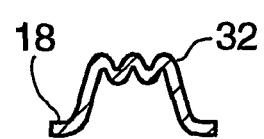

SELF-SEALING FUEL CELL SEPARATOR

This is a 371 national phase application of PCT/JP2004/006090 filed 27 Apr. 2004, claiming priority to Japanese Application No. 2003-138652 filed 16 May 2003, the contents of which are incorporated herein by reference.

FIELD OF THE INVENTION

The present invention relates to a fuel cell. More particularly, the present invention relates to a seal structure of a fuel cell having a metal separator.

BACKGROUND OF THE INVENTION

FIGS. 5 and 6 illustrate a fuel cell, where a PEFC (Polymer Electrolyte Fuel Cell) 10 includes a membrane-electrode assembly (MEA) and a separator 18. The MEA includes an electrolyte membrane 11 and a pair of electrodes 14 and 17 disposed on opposite sides of the electrolyte membrane 11. The pair of electrodes 14 and 17 includes an anode 14 provided on one side of the membrane and constructed of a first catalyst layer 12, and a cathode 17 provided on the other side of the membrane and constructed of a second catalyst layer 15. A first diffusion layer 13 may be provided between the first catalyst layer 12 and a first separator 18, and a second diffusion layer 16 may be provided between the second catalyst layer 15 and a second separator 18. The first separator 18 has a fuel gas passage 27 formed therein for supplying fuel gas (hydrogen) to the anode 14, and the second separator 18 has an oxidant gas passage formed therein for supplying oxidant gas (oxygen, usually, air) to the cathode 17. The first and second separators have a coolant passage 26 on opposite sides of the fuel gas passage 27 and the oxidant gas passage 28. The first and second separators 18 further have a fuel gas manifold 30 and an oxidant gas manifold 31 formed therein and fluidly connected to the fuel gas passage 27 and the oxidant gas passage 28, respectively, and a coolant manifold 29 formed therein and fluidly connected to the coolant passage 26. One or more fuel cell 10 constructs a module. As seen by way of example in FIG. 1, number of modules are piled, and electrical terminals 20, electrical insulators 21, and end plates 22 are disposed at opposite ends of the pile of modules. After the pile of modules is tightened between the opposite end plates 22 in a fuel cell stacking direction, the opposite end plates 22 are coupled to a fastening member (for example, a tension plate 24) extending in the fuel cell stacking direction outside the pile of fuel cells, by bolts and nuts 25 to construct a stack of fuel cells 23.

In the PEFC, at the anode 14, hydrogen changes to positively charged hydrogen ions (i.e., protons) and electrons. The hydrogen ions move through the electrolyte membrane 11 to the cathode 17 where the hydrogen ions react with oxygen supplied and electrons (which are generated at an anode of the adjacent MEA and move to the cathode 17 of the instant MEA through a separator) to form water as follows:

At the anode: 
At the cathode: 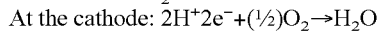

The fuel gas passage 27, the fuel gas manifold 30, the oxidant gas passage 28, the oxidant gas manifold 31, the coolant passage 26 and the coolant manifold 29 construct a fluid passage. The fluid passage is sealed so that fuel gas, oxidant gas and coolant are not mixed with each other and do not leak outside.

Japanese Patent Publication No. 2002-289223 discloses that in a fuel cell including a separator made from metal, a gasket made independently of the separator is provided between the separator of a fuel cell and a separator of an adjacent fuel cell to seal between the two fuel cells.

In the fuel cell including the metal separator 18 and a rubber gasket 40, as illustrated in FIGS. 5 and 6, a seal between a fuel cell and the adjacent fuel cell is made by causing a top portion of the rubber gasket 40, which is fixed by heat to the metal separator 18 of the fuel cell, to contact a separator of the adjacent fuel cell. The seal between the separators of the fuel cell disposed on opposite sides of the MEA is conducted by an adhesive 33 provided between the separators.

However, in a fuel cell using a rubber gasket, the following problems exist:
i) A gasket must necessary be provided independently of the separator.
ii) If the gasket is offset from a normal position, leakage may happen.
iii) If the gasket is fixed to the metal separator by heat, a flash is likely to be generated and such flash has to be removed by hand. When the flash is removed, the gasket itself is likely to be damaged in such manner as to cause leakage. If the removed flash adheres to the gasket, the flash may prevent the gasket from contacting a separator of an adjacent fuel cell and in this way lead to leakage.

SUMMARY OF THE INVENTION

An object of the present invention is to provide a fuel cell or a seal structure of a fuel cell which makes a gasket, which is provided independently of the separator unnecessary.

A fuel cell according to the present invention to achieve the above object may be described as follows:
(1) The fuel cell of the present invention includes an MEA and a metal separator disposed on each side of the MEA. The metal separator has a fluid passage formed therein. The fluid passage includes a reactant gas passage formed at a first, MEA-opposing surface of the metal separator, a coolant passage formed at a second, opposite surface of the metal separator, a reactant gas manifold fluidly connected to the reactant gas passage and a coolant manifold fluidly connected to the coolant passage. The fuel cell is piled with other fuel cells to construct a stack of fuel cells.

The metal separator includes a rib formed therein so as to surround a portion of the metal separator where the fluid passage is formed. The rib of an instant metal separator contacts a metal separator of an adjacent fuel cell to construct a seal for a fluid passage surrounded by the rib.
(2) The rib which seals between the instant fuel cell and the adjacent fuel cell realizes a gasket-less structure between the fuel cell and the adjacent fuel cell.
(3) The rib is a protrusion formed by stamping the metal separator and is integral with the metal separator.
(4) The rib is formed in either one of the metal separators disposed on opposite sides of the MEA of each fuel cell.
(5) The rib protrudes in a direction away from the MEA of each fuel cell.
(6) The rib has a height to press the metal separator of said adjacent fuel cell at a top portion of said rib.
(7) The rib has a plate thickness to provide elasticity.
(8) The rib is formed in a stamping process where said reactant gas passage and said coolant passage are stamped and where said reactant gas manifold and said coolant manifold are stamped.
(9) A plurality of seal lines extending in parallel with each other is formed around said portion of the metal separator where the fluid passage is formed. Each seal line of the plurality of seal lines corresponds to a rib.

(10) The rib has a top portion having a cross sectional shape corresponding to any one shape of an arcuate convex, a trapezoidal convex, or a wave alternately including a convex and a concave.

(11) Cross-sectional shapes of top portions of the ribs of the plurality of seal lines are different from each other.

With respect to a fuel cell according to the present invention, the following technical advantages are obtained:

According to the fuel cell described in items (1)-(11) above, since the rib is formed in the metal separator itself and the rib contacts the separator of the adjacent fuel cell to construct a seal for the fluid passage surrounded by the rib, a gasket of the fuel cell of comparison is unnecessary. By removing the gasket, there is no fear of leakage due to the gasket.

According to the fuel cell described at item (2) above, due to the gasket-less structure realized by the rib, the number of parts of the fuel cell is reduced. Further, assembly of the fuel cell stack is easy, and there is no fear of injury of the gasket which will generate leakage.

According to the fuel cell described at item (3) above, since the rib is integral with the metal separator, the rib is prevented from being offset from the normal position relative to the separator and leakage due to such offsetting can be prevented and suppressed.

According to the fuel cell described at items (4)-(7) above, since the rib is formed from a thin metal plate, the rib has elasticity. As a result, the rib can follow and contact the separator of the adjacent fuel cell, to effectively seal between the instant fuel cell and the adjacent fuel cell, even though the rib is made from metal.

According to the fuel cell described at item (8) above, since the rib is formed in the same stamping as the stamping where the fluid passage is formed and/or the stamping where the fluid manifold is formed, manufacture of the rib is not accompanied by an increase in the manufacturing process of the separator and the fuel cell.

According to the fuel cell described at item (9) above, since a plurality of seal lines is formed around the portion of the metal separator where the fluid passage is formed, seal reliability is improved compared with a case of a single seal line.

According to the fuel cell described at item (10) above, since the rib has a top portion having a cross-sectional shape corresponding to any one shape of an arcuate convex, a trapezoidal convex, or a wave alternately including a convex and a concave, the rib can be formed by stamping and provides a good seal.

According to the fuel cell described at item (11) above, since the cross-sectional shapes of rib top portions of ribs of the plurality of seal lines are different from each other, seal reliability of the rib is increased.

BRIEF DESCRIPTION OF THE DRAWINGS

The fuel cell of the present invention will now be described with reference to the accompanying drawings, in which:

FIG. 3 is a front elevational view of a separator, of the side where a rib is formed, of a fuel cell according to the present invention;

FIG. 4A is a cross-sectional view of a rib having a first cross-sectional shape, of a fuel cell according to the present invention;

FIG. 4B is a cross-sectional view of a rib having a second cross-sectional shape, of a fuel cell according to the present invention;

FIG. 4C is a cross-sectional view of a rib having a third cross-sectional shape, of a fuel cell according to the present invention;

DETAILED DESCRIPTION OF THE PREFERRED EMBODIMENT

Figure 5:
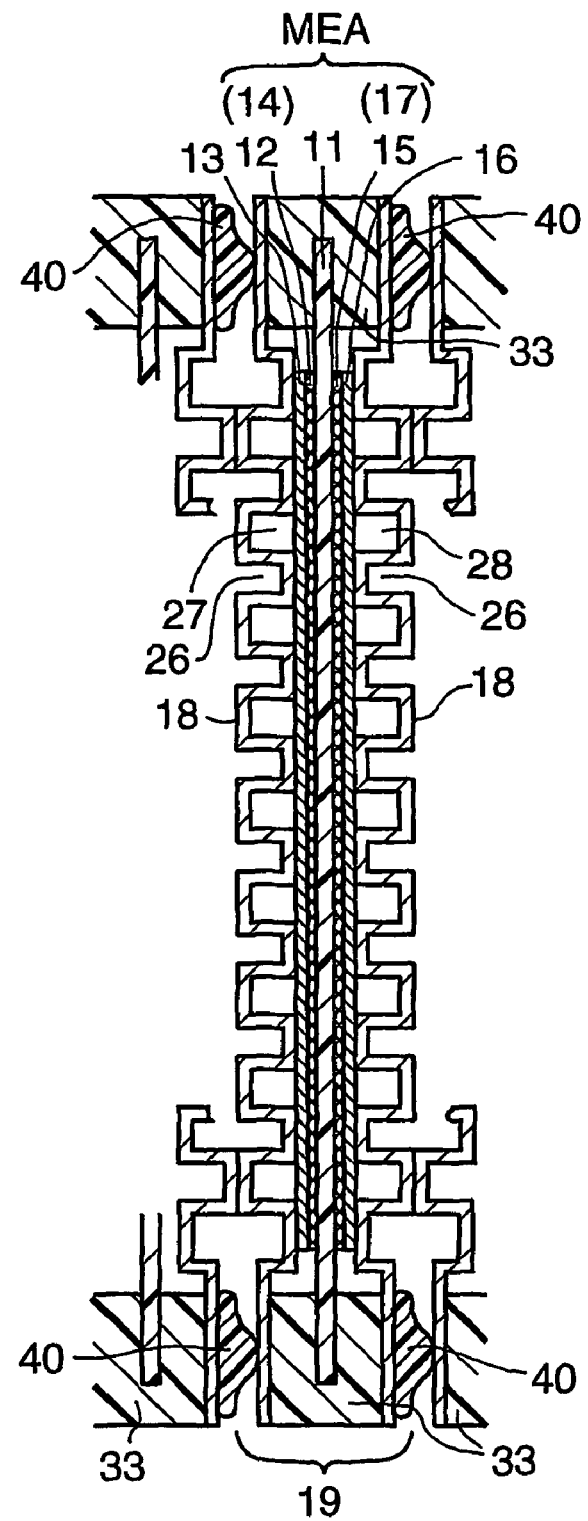
FIG. 5 is a cross-sectional view of a fuel cell of comparison (not prior art)
Figure 6:
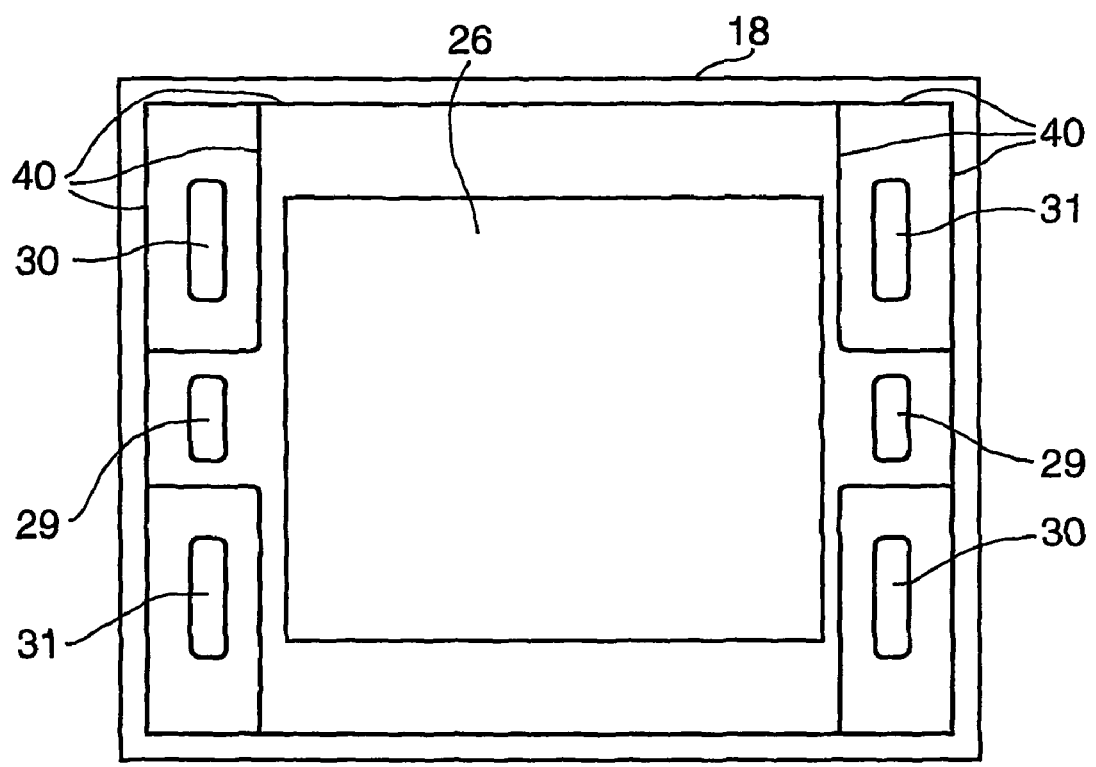
FIG. 6 is a front elevational view of the fuel cell of FIG. 5.

A fuel cell and a seal structure thereof according to the present invention will be explained with reference to FIGS. 1-4. A general structure of the fuel cell of comparison of FIGS. 5 and 6 is also applicable to the fuel cell according to the present invention.

The fuel cell 10 according to the present invention is of a polymer electrolyte fuel cell (hereinafter, PEFC)-type. The fuel cell 10 is mounted to, for example, a vehicle. However, the fuel cell 10 may be used in an environment other than a vehicle.

Figure 1:
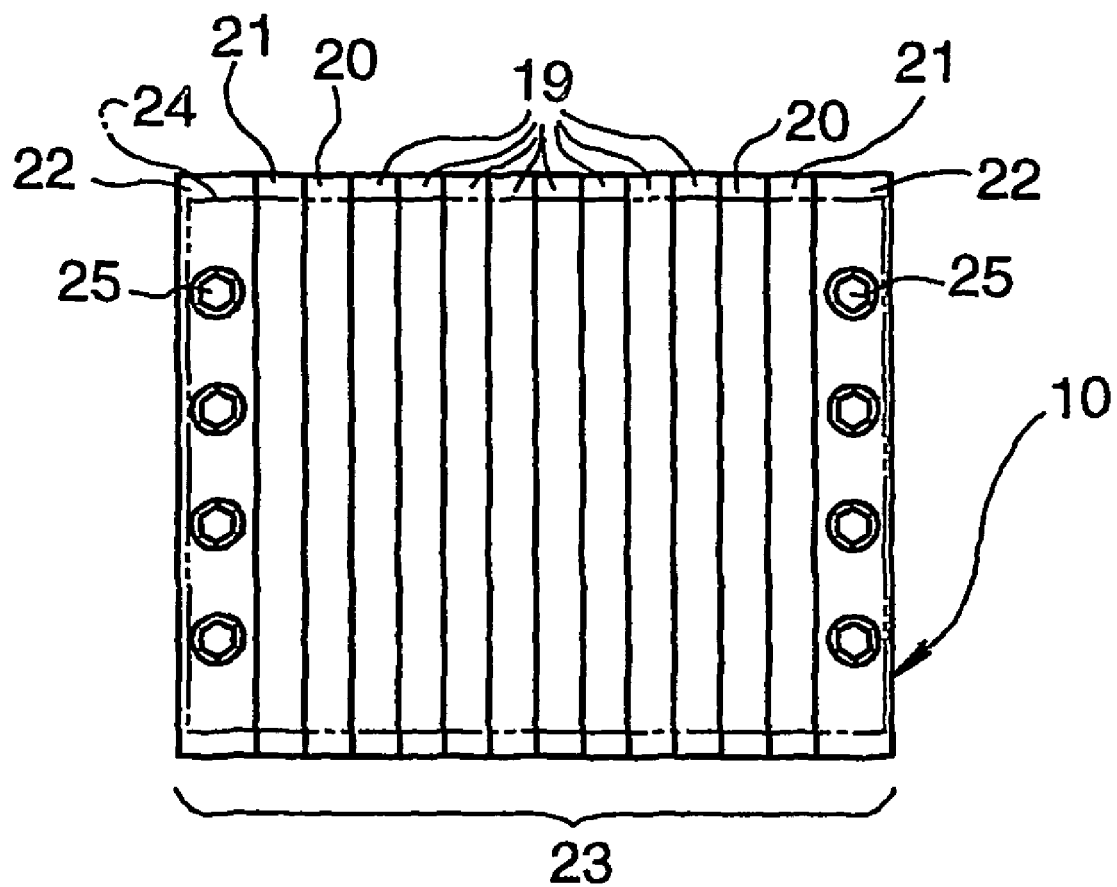
FIG. 1 is a side elevational view of a fuel cell stack including a fuel cell according to the present invention, or, alternatively, a prior art fuel cell.
Figure 2:
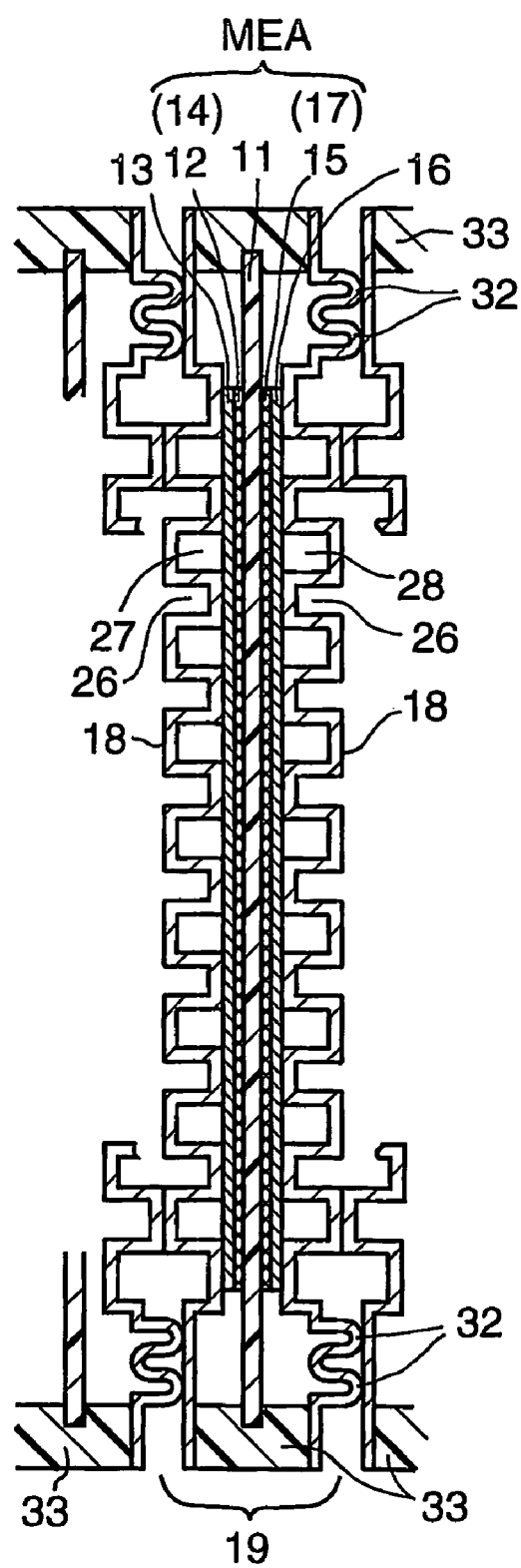
FIG. 2 is a cross-sectional view of a fuel cell according to the present invention.

As illustrated in FIGS. 1-3, the PEFC 10 includes a membrane-electrode assembly (MEA) and a separator 18 layered to the MEA. The layering direction is not restricted to a vertical direction and may be any direction. The MEA includes an electrolyte membrane 11 and a pair of electrodes disposed on opposite sides of the membrane 11. The pair of electrodes include (a) an anode 14 provided on one side of the membrane and including a first catalyst layer 12 and (b) a cathode 17 provided on the other side of the membrane and including a second catalyst layer 15. A first diffusion layer 13 may be disposed between the first catalyst layer 12 and a first separator 18 provided on an anode side of the MEA, and a second diffusion layer 16 may be disposed between the second catalyst layer 15 and a second separator 18 provided on a cathode side of the MEA.

At least one fuel cell constructs a module 19. A number of modules are piled, and electrical terminals 20, electrical insulators 21, and end plates 22 are disposed at opposite ends of the pile of modules to constructs a stack of fuel cells 23. After tightening the stack of fuel cells 23 between the end plates 22 in a fuel cell stacking direction, the end plates 22 are coupled to the fastening member 24 (for example, a tension plate) extending in the fuel cell stacking direction outside the pile of the fuel cell by bolts or nuts 25.

The separator 18 is made from metal. The separator 18 may be called a metal separator 18 hereinafter. The metal separator 18 includes a first metal separator disposed on one side of the MEA and a second metal separator disposed on the other side of the MEA.

The first metal separator 18 disposed on the anode side of the MBA has a fuel gas passage 27 formed therein at a first, MEA opposing surface of the first metal separator for supplying fuel gas (hydrogen) to the anode 14 and a coolant (cooling water) passage 26 formed therein at a second, opposite surface of the first metal separator. The second metal separator 18 disposed on the cathode side of the MEA has an oxidant gas passage 28 formed therein at a first, MEA opposing surface of the second metal separator for supplying oxidant gas (oxygen, usually, air) to the cathode 17 and a coolant (cooling water) passage 26 formed therein at a second, opposite surface of the second metal separator The fuel gas passage 27 formed in the first metal separator and the oxidant gas passage 28 formed in the second metal separator construct a reactant gas passage formed in the separator. The reactant gas passage 27, 28 and the coolant passage 26 are formed at a portion distinct from the opposite end portions of a rectangular separator, i.e., a power generating region, and extend in a fuel cell in-plane direction (a direction perpendicular to a fuel cell stacking direction). The reactant gas passage 27, 28 and the coolant passage 26 are made by stamping the metal separator 18 to the form including a convex and a concave.

Each of the first and second metal separators has a fuel gas manifold 30 in fluid communication with the fuel gas passage 27, an oxidant gas manifold 31 fluidly connected to the oxidant gas passage 28, and a coolant manifold 29 fluidly connected the coolant passage 26. The fuel gas manifold 30 and the oxidant gas manifold 31 construct a reactant gas manifold 30, 31. The reactant gas manifold 30, 31 and the coolant manifold 29 are formed at the opposite end portions of the rectangular separator distinct from the power generating region.

The fuel gas passage 27, the oxidant gas passage 28, the coolant passage 26, the fuel gas manifold 30, the oxidant gas manifold 31 and the coolant manifold 29 construct a fluid passage. The different fluid passages (fuel gas, oxidant gas, and coolant) are sealed from each other so that different kinds of fluid are not mixed with each other.

A seal in a fuel cell, i.e., a seal between the first and second metal separators disposed on opposite sides of the MEA of the fuel cell, is made by adhesive 33 in the same way as in the comparison fuel cell of FIG. 5. However, a seal between fuel cell and an adjacent fuel cell is made according to the present invention by a rib 32, which will be explained in more detail below as illustrated in FIGS. 1-4. The fuel cell of the present invention differs from the comparison fuel cell in that seal structure by the rib 32.

The rib 32 is formed in the metal separator 18 itself having the fluid passage formed therein. The rib 32 is not made from a rubber gasket but made from a portion of the metal separator itself. The rib 32 is formed such that the rib 32 surrounds a portion of the metal separator 18 where the fluid passage is formed.

More particularly, as illustrated in FIG. 3, the rib 32 extends so as to surround a portion of the metal separator where the oxidant gas passage 27, 28, the coolant passage 26 and the coolant manifold 29 are formed, a portion of the metal separator where the fuel gas manifold 30 is formed, and a portion of the metal separator where the oxidant gas manifold 31 is formed.

The rib 32 of the instant fuel cell contacts, at a top portion thereof, the metal separator of the adjacent fuel cell and seals a portion surrounded by the rib 32. The rib 32 is arranged at substantially the same position as that of the rubber gasket 40 of the fuel cell of comparison, and by replacing the rubber gasket with the rib 32, no rubber gasket need be disposed between the instant fuel cell and the adjacent fuel cell, so as to realize a gasket-less structure between the instant fuel cell and the adjacent fuel cell.

The rib 32 is a protrusion formed by stamping the metal separator 18 and is integral with the metal separator 18.

The rib 32 is formed in either one of the metal separators 18 disposed on opposite sides of the MEA of each fuel cell. When the rib 32 is formed in the first, anode side separator 18, the rib is not formed in the second, cathode side separator 18. When the rib 32 is formed in the second, cathode side separator 18, the nib is not formed in the first, anode side separator 18.

The rib 32 protrudes in a direction away from the M of each fuel cell in a fuel cell stacking direction. The rib 32 of the metal separator of the instant fuel cell has a height to press the metal separator 18 of the adjacent fuel cell at a top portion of the rib 32 when the stack 23 of fuel cells is tightened in the fuel cell stacking direction.

The rib 32 has a thin plate thickness to provide elasticity in the fuel cell stacking direction, even though the rib 32 is made from metal. A seal by the rib 32 is obtained by metal-to-metal contact of the top portion of the rib 32 and the metal separator 18 of the adjacent fuel cell.

The rib 32 is formed in the same stamping process as a stamping where the reactant gas passage 27, 28 and the coolant passage 26 are stamped and/or a stamping where the reactant gas manifold 30, 31 and the coolant manifold 29 are stamped. As a result, formation of the rib 32 is not accompanied by any increase in the stamping process.

The rib 32 may be formed in the metal separator 18 in the form of a plurality sub-ribs parallel to each other so as to provide a plurality of seal lines extending in parallel with respect to each other around the portion of the metal separator where the fluid passage is formed. The rib 32 may be a single rib so as to provide a single seal line. FIG. 3 illustrates a case where two seal lines are provided. The number of the plurality of seal lines may be more than two.

The top ("top" in the fuel cell stacking direction) portion of the rib 32 has a cross-sectional shape corresponding to any one shape of an arcuate convex as illustrated in FIG. 4A, a trapezoidal convex as illustrated in FIG. 4B, or a wave alternately including a convex and a concave as illustrated in FIG. 4C.

In the case of the plurality of seal lines, preferably, cross-sectional shapes of top portions of ribs 32 of the plurality of seal lines are different from each other so that even if a seal of one seal line is broken, a seal of the remaining seal line is unlikely to be broken in the same manner as in the one seal line. For example, when the cross-sectional shape of the top portion of the rib 32 of a first, inner seal line is an arcuate convex, the cross-sectional shape of the rib top portion of the rib 32 of a second, outer seal line is a wave.

Next, technical advantages obtained by the present invention will be explained.

In the present invention, since the rib 32 is formed in the metal separator 18 itself and the rib 32 contacts the separator 18 of the adjacent fuel cell to construct a seal for the fluid passage surrounded by the rib 32, the rubber gasket 40 of the fuel cell of FIG. 5 does not need to be provided in the fuel cell of the present invention. By replacing the rubber gasket 40 by the rib 32 and removing the rubber gasket 40 from the stack 23 of fuel cells, there is no fear of leakage due to damage to or breakage of the gasket 40.

Due to the gasket-less structure realized by the rib 32, the number of parts of the fuel cell is reduced and the manufacturing cost of the fuel cell stack 23 is decreased. Further, assembly of the fuel cell stack 23 is easy, and there is no fear of damage to the gasket 40 which may generate leakage, during assembly of the fuel cell stack 23.

Since the rib 32 is integral with the metal separator 18, the rib 32 is prevented from being offset from the normal position relative to the separator 18 and leakage due to such offsetting can be suppressed.

Since the rib 32 is formed from a thin metal plate, the rib 32 has elasticity. As a result, the rib 32 can follow and contact, with elasticity, the separator of the adjacent fuel cell to seal between the instant fuel cell and the adjacent fuel cell, even though the rib 32 is made from metal.

Since the rib 32 is formed in the same stamping process as the stamping where the fluid passage is formed and/or the stamping where the fluid manifold is formed, formation of the rib 32 is not accompanied by an increase in the manufacturing process of the separator 18.

In the case where a plurality of seal lines is formed around the portion of the metal separator where the fluid passage is formed by constructing each seal line by each rib 32, seal reliability is improved compared with a case of a single seal line. In the case of the plurality of seal lines, even if one seal line is broken, the remaining seal line is effective so that the fuel cell can be operated.

Since the top portion of the rib 32 has a cross-sectional shape corresponding to any one shape of an arcuate convex, a trapezoidal convex, or a wave alternately including a convex and a concave, the rib 32 can be formed by stamping.

In the case of a plurality of seal lines is provided, if the cross-sectional shapes of rib top portions of ribs 32 of the plurality of seal lines are made different from each other, seal reliability of the rib 32 is increased, because when one seal line is broken, the remaining back-up seal line will be unlikely to be broken by the same reason and in the same manner as the one seal line.

It will be understood that other embodiments of the invention will be readily apparent to a person skilled in the art, the scope of the invention being defined in the appended claims.

The invention claimed is:

1. A fuel cell comprising a membrane-electrode assembly and a first metal separator and a second metal separator disposed, respectively, on each side of said membrane-electrode assembly, each of said metal separators defining a fluid passage, said fluid passage defining a reactant gas passage formed at a first, membrane-electrode assembly-opposing surface of said metal separator, a coolant passage formed at a second, opposite surface of said metal separator, a reactant gas manifold fluidly connected to said reactant gas passage and a coolant manifold fluidly connected to said coolant passage, said fuel cell having first and second sides and being adapted to be piled with other fuel cells to construct a stack of fuel cells, wherein said first metal separator includes a rib made from said metal formed thereon so as to surround a portion of said first metal separator where said fluid passage is formed, said rib being adapted to metal-to-metal contact with a metal separator of an adjacent fuel cell to construct a seal for a fluid passage surrounded by said rib, a seal line constructed by said rib extending around said portion of the first metal separator where said fluid passage is formed, wherein said rib is integral with said first metal separator, and said rib protrudes in a direction away from a first side of the fuel cell and said rib has a top portion having a cross-sectional shape in the form of an alternating convex and concave surface, wherein said metal rib is adapted to realize a gasket-less structure between said fuel cell on said first side and a flat surface portion of said adjacent fuel cell, and said rib is located on only said first metal separator protruding away from said first side of said fuel cell, and wherein said rib has a plate thickness to provide elasticity, the plate thickness of said rib being constant and substantially equal to a thickness of each of the first and second separators.

2. A fuel cell according to claim 1, wherein said rib has a height to press the metal separator of said adjacent fuel cell at a top portion of said rib.

3. A fuel cell according to claim 1, wherein said rib is a rib formed in a stamping where said reactant gas passage and said coolant passage are stamped and where said reactant gas manifold and said coolant manifold are stamped.

4. A fuel cell according to claim 1, wherein a plurality of seal lines extending in parallel with respect to each other is formed around said portion of said metal separator where said fluid passage is formed, each seal line of said plurality of seal lines being constructed by said rib.

5. A fuel cell according to claim 4, wherein cross-sectional shapes of top portions of said ribs of said plurality of seal lines are different from each other.

6. The fuel cell of claim 1, wherein the seal line constructed by said rib extends around said portion of the first metal separator at only the periphery of the membrane-electrode assembly.

7. A fuel cell comprising an membrane-electrode assembly and a first metal separator and a second metal separator disposed, respectively, on each side of said membrane-electrode assembly, each of said metal separators defining a fluid passage, said fluid passage defining a reactant gas passage formed at a first, membrane-electrode assembly-opposing surface of said metal separator, a coolant passage formed at a second, opposite surface of said metal separator, a reactant gas manifold fluidly connected to said reactant gas passage and a coolant manifold fluidly connected to said coolant passage, said fuel cell having first and second sides and being adapted to be piled with other fuel cells to construct a stack of fuel cells, wherein said first metal separator includes a plurality of convex and concave stamped passages and a rib made from said metal formed thereon so as to surround a portion of said first metal separator where said fluid passage is formed, said rib being adapted to metal-to-metal contact a flat side of a metal separator of an adjacent fuel cell to construct a seal for a fluid passage surrounded by said rib, a seal line constructed by said rib extending around said portion of the first metal separator where said fluid passage is formed, wherein said rib is integral with said first metal separator, and said rib protrudes in a direction away from a first side of the fuel cell and said rib has a top portion having a cross-sectional shape in the form of a convex arcuate surface, and said rib is located on only said first metal separator protruding away from said first side of said fuel cell, and wherein said rib has a plate thickness to provide elasticity, the plate thickness of said rib being constant and substantially equal to a thickness of each of the first and second separators.

8. The fuel cell of claim 7, wherein the seal line constructed by said rib extends around said portion of the first metal separator at only the periphery of the membrane-electrode assembly.

9. A fuel cell according to claim 7, wherein said rib has a height to press the metal separator of said adjacent fuel cell at a top portion of said rib.

10. A fuel cell according to claim 7, wherein said rib is a rib formed in a stamping where said reactant gas passage and said coolant passage are stamped and where said reactant gas manifold and said coolant manifold are stamped.

11. A fuel cell according to claim 7, wherein a plurality of seal lines extending in parallel with respect to each other is formed around said portion of said metal separator where said fluid passage is formed, each seal line of said plurality of seal lines being constructed by said rib.

12. A fuel cell comprising an membrane-electrode assembly and a first metal separator and a second metal separator disposed, respectively, on each side of said membrane-electrode assembly, each of said metal separators defining a fluid passage, said fluid passage defining a reactant gas passage formed at a first, membrane-electrode assembly-opposing surface of said metal separator, a coolant passage formed at a second, opposite surface of said metal separator, a reactant gas manifold fluidly connected to said reactant gas passage and a coolant manifold fluidly connected to said coolant passage, said fuel cell having first and second sides and being adapted to be piled with other fuel cells to construct a stack of fuel cells, wherein said first metal separator includes a plurality of convex and concave stamped passages and a rib made from said metal formed thereon so as to surround a portion of said first metal separator where said fluid passage is formed, said rib being adapted to metal-to-metal contact a flat side of a metal separator of an adjacent fuel cell to construct a seal for a fluid passage surrounded by said rib, a seal line constructed by said rib extending around said portion of the first metal separator where said fluid passage is formed, wherein said rib is integral with said first metal separator, and said rib protrudes in a direction away from a first side of the fuel cell and said rib has a top portion having a cross-sectional shape in the form of a trapezoidal convex surface, and said rib is located on only said first metal separator protruding away from said first side of said fuel cell, and wherein said rib has a plate thickness to provide elasticity, the plate thickness of said rib being constant and substantially equal to a thickness of each of the first and second separators.

13. The fuel cell of claim 12, wherein the seal line constructed by said rib extends around said portion of the first metal separator at only the periphery of the membrane-electrode assembly.

14. A fuel cell according to claim 12, wherein said rib has a height to press the metal separator of said adjacent fuel cell at a top portion of said rib.

15. A fuel cell according to claim 12, wherein said rib is a rib formed in a stamping where said reactant gas passage and said coolant passage are stamped and where said reactant gas manifold and said coolant manifold are stamped.

16. A fuel cell according to claim 12, wherein a plurality of seal lines extending in parallel with respect to each other is formed around said portion of said metal separator where said fluid passage is formed, each seal line of said plurality of seal lines being constructed by said rib.

* * * * *

UNITED STATES PATENT AND TRADEMARK OFFICE
CERTIFICATE OF CORRECTION

PATENT NO. : 7,923,169 B2  
APPLICATION NO. : 10/556536  
DATED : April 12, 2011  
INVENTOR(S) : Satoshi Ohnuma Page 1 of 1

It is certified that error appears in the above-identified patent and that said Letters Patent is hereby corrected as shown below:

| Column | Line | |
|---|---|---|
| 1 | 58 | Change "$2H^+2e^-+(1/2)O_2 \rightarrow H_2O$" to --$2H^+ + 2e^- + (1/2)O_2 \rightarrow H_2O$--. |
| 5 | 65 | Change "from the M" to --from the MEA--. |

Signed and Sealed this

Twentieth Day of September, 2011

David J. Kappos
*Director of the United States Patent and Trademark Office*